United States Patent [19]

Fukuo et al.

[11] Patent Number: 4,622,933
[45] Date of Patent: Nov. 18, 1986

[54] LUBRICANT FEED SYSTEM FOR USE IN THE JOURNAL OF A CRANKSHAFT

[75] Inventors: Koichi Fukuo; Hiroki Yamamoto, both of Saitama, Japan

[73] Assignee: Honda Giken Kogyo Kabushiki Kaisha, Tokyo, Japan

[21] Appl. No.: 808,842

[22] Filed: Dec. 13, 1985

[30] Foreign Application Priority Data

Dec. 14, 1984 [JP] Japan .................. 59-265018

[51] Int. Cl.⁴ ........................................... F01M 1/00
[52] U.S. Cl. ...................... 123/196 R; 184/6.5; 123/195 R; 384/160 R
[58] Field of Search .......... 123/196 R, 196, 195 R; 184/6.5, 6.8; 308/78.1; 384/93

[56] References Cited

U.S. PATENT DOCUMENTS

| | | | |
|---|---|---|---|
| 2,199,699 | 5/1940 | Frelin | 184/6.5 |
| 3,069,926 | 12/1962 | Hoffman et al. | 184/6.5 |
| 4,345,796 | 8/1982 | Ballheimer | 184/6.5 |

*Primary Examiner*—E. Rollins Cross
*Attorney, Agent, or Firm*—Irving M. Weiner; Joseph P. Carrier; Pamela S. Burt

[57] ABSTRACT

There is disclosed a lubricant feed system for use in a journal of a crankshaft comprising first bearing supporting portions formed in a cylinder block, each having a peripheral surface, second bearing supporting portions formed in caps, each having a peripheral surface, first bearings in the form of half shells arranged on the peripheral surfaces of the first bearing supporting portions, second bearings in the form of half shells arranged on the peripheral surfaces of the second bearing supporting portions and an oil main gallery. In this arrangement, annular grooves are formed on the peripheral surfaces of the first and second bearing supporting portions and oil grooves are circumferentially formed at the inner peripheral surfaces of the first bearings. Apertures are formed at the first bearings to communicate the annular grooves with the oil grooves. The inner peripheral surfaces of the second bearings are made flat. Further, a bridge is mounted on the undersides of the bearing caps and the oil main gallery is provided in the bridge. The oil main gallery is communicated with the annular grooves in the second bearing supporting portions. Oil in the oil main gallery is fed to the annular grooves to directly cool the second bearings to which explosive loads are applied.

3 Claims, 5 Drawing Figures

LUBRICANT FEED SYSTEM FOR USE IN THE JOURNAL OF A CRANKSHAFT

BACKGROUND OF THE INVENTION

1. Field of the Invention

The present invention relates to a lubricant feed system in the journal of a crankshaft for an internal combustion engine.

2. Description of the Related Art

The journal of a crankshaft is generally supported by bearing supporting portions respectively formed in a cylinder block and caps. Such bearings, in the form of half shells, are arranged on the bearing supporting portions of the cylinder block and the caps. With this arrangement, lubricant in an oil main gallery is fed to the bearings via given passages.

Japanese patent publication No. 58-27124, for instance, discloses a system for feeding lubricant to such a journal. In the disclosed system, oil grooves are formed at bearing supporting portions in a cylinder block and annular grooves are formed at the inner peripheral surfaces of the bearings. The oil grooves are communicated with the annular grooves via apertures formed at the bearings. Further, an oil main gallery is provided in the cylinder block and the lubricant is fed to the oil grooves of the bearing supporting portions in the cylinder block and the bearings arranged thereon. The inner peripheral surfaces of the bearings are made flat to ensure sufficient bearing area between the bearings in the caps and the journal to prevent seizing thereof.

However, no grooves are formed to feed the lubricant from the oil main gallery to the bearing supporting portions in the caps and the bearings arranged thereon. It is for this reason that the bearings to which explosive loads are applied are not sufficiently cooled.

SUMMARY OF THE INVENTION

It is, therefore, a primary object of the present invention to provide a lubricant feed system which may efficiently cool bearings arranged on bearing caps to which explosive loads are applied.

It is another object of the present invention to provide a lubricant feed system which may ensure sufficient bearing area between bearings arranged on caps and the journal of a crankshaft.

It is a further object of the invention to provide a lubricant feed system, wherein a bridge is provided so as to improve the strength and rigidity of such members as bearing caps to support the journal of a crankshaft.

In accordance with a preferred embodiment of the present invention, a lubricant feed system for use in a journal of a crankshaft comprises first bearing supporting portions formed in a cylinder block, each having a peripheral surface, second bearing supporting portions formed in caps, each having a peripheral surface, first bearings in the form of half shells arranged on the peripheral surfaces of the first bearing supporting portions, second bearings in the form of half shells arranged on the peripheral surfaces of the second bearing supporting portions and an oil main gallery. In this arrangement, annular grooves are formed on the peripheral surfaces of the first and second bearing supporting portions and oil grooves are circumferentially formed at the inner peripheral surfaces of the first bearings. Apertures are formed at the first bearings to communicate the annular grooves with the oil grooves. The inner peripheral surfaces of the second bearings are made flat. Further, a bridge is mounted on the undersides of the bearing caps and the oil main gallery is provided in the bridge. The oil main gallery is communicated with the annular grooves in the second bearing supporting portions.

The above and other objects and advantages of the present invention will become more apparent from the following detailed description taken in connection with the accompanying drawings.

DETAILED DESCRIPTION OF PREFERRED EMBODIMENTS OF THE INVENTION

Figure 1:
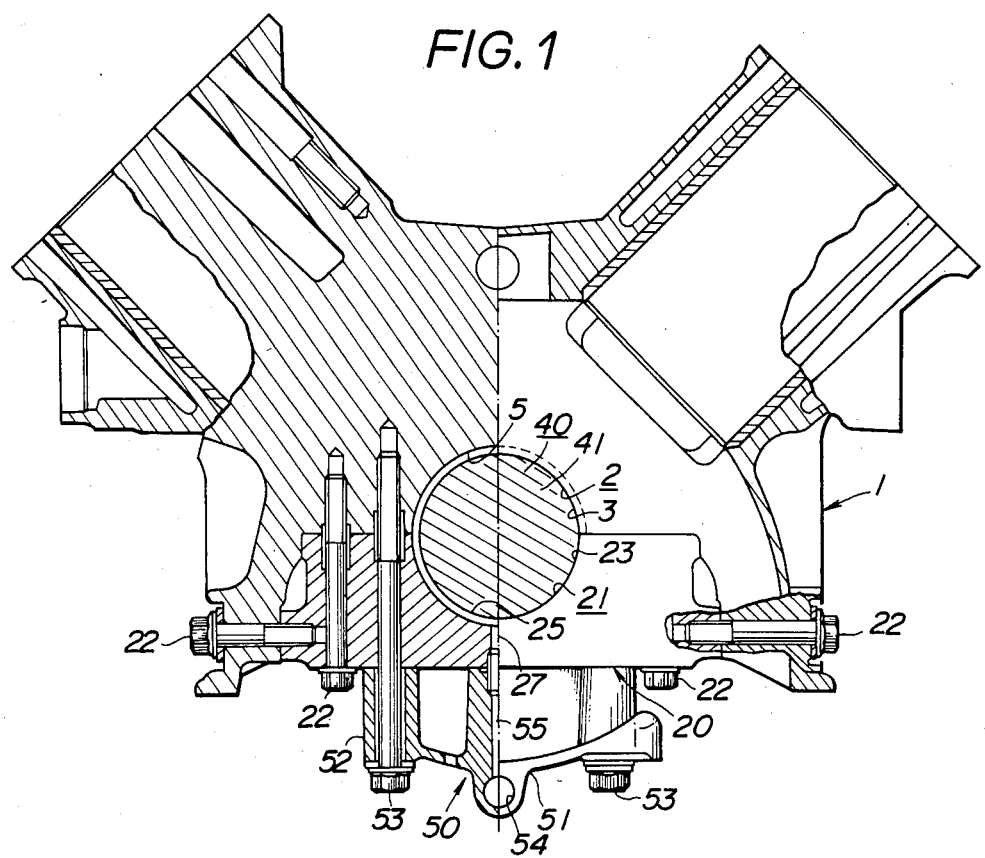
FIG. 1 is a sectional front view of a lubricant feed system according to a first embodiment of the present invention.

Throughout the following description and drawings, life reference numerals designate like or corresponding parts shown in various multiple figures of the drawings.

Figure 2:
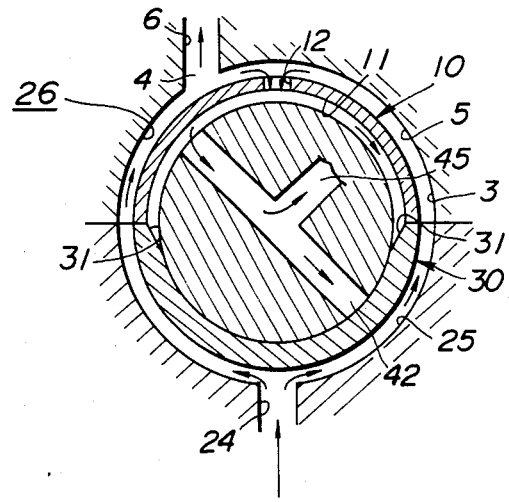
FIG. 2 is a sectional side view, on an enlarged scale, of bearings in the lubricant feed system shown in FIG. 1.

Referring now to the drawings and in particular to FIG. 1, reference numeral 1 represents a cylinder block, said cylinder block having first bearing supporting portions 2 in the form of recesses. Each of the first bearing supporting portions 2 has a peripheral surface 3 and an opening 4 as shown in FIG. 2. Formed circumferentially at the peripheral surface 3 of each of the first bearing supporting portions 2 is an oil groove 5 which is, in turn, in communication with a passage 6 through which lubricant is fed to a cylinder head (not shown.)

Reference numeral 10 represents first bearings in the form of half shells arranged on the peripheral surfaces 3 of the first bearing supporting portions 2. Formed circumferentially at the inner peripheral surface of each first bearing 10 is an oil groove 11. An aperture 12 is formed at the top of the first bearing 10 to communicate the oil groove 5 with the oil groove 11. It is to be noted that the apertures 12 are circumferentially offset from the opening 4 of the corresponding first bearing supporting portion 2.

Reference numeral 20 represents bearing caps 20, each bearing cap 20 having a second bearing supporting portion 21. The second bearing supporting portions 21 are fixedly mounted on the underside of the cylinder block 1 by bolts 22, 22. Each of the second bearing supporting portions 21 has a peripheral surface 23, and has an opening 24 at its bottom as shown in FIG. 2. Formed circumferentially at the peripheral surface 23 of each of the second bearing supporting portions 21 is an oil groove 25, which in cooperation with the corresponding oil groove 5 of each of the first bearing supporting recesses 2 forms an annular groove 26.

Reference numeral 30 represents second bearings in the form of half shells arranged on the peripheral surfaces 23 of the second bearing supporting portions 21. The second bearings 30 and the first bearings 10 together support a journal 41 of a crankshaft 40. It is to be noted that the inner and outer peripheral surfaces of the second bearings 30 are made flat in an effort to ensure sufficient bearing area between the second bearings 30 and the journal 41 of the crankshaft 40. Reference numeral 31 represents an inclined surface formed at the upper end of the inner peripheral surface of each of the second bearings 30 corresponding to the oil groove 11 of each of the first bearings 10.

Reference numeral 50 represents a bridge, said bridge 50 including a body 51 extending longitudinally of the crankshaft 40 and bosses 52 extending toward the corresponding bearing caps 20. The bridge 50 and the bearing caps 20 are bolted to the cylinder block 10 by bolts 53, 53 of sufficient length. By virtue of this arrangement, the strength and rigidity of such members as bearing caps for supporting the crankshaft may desirably be improved.

Figure 4:
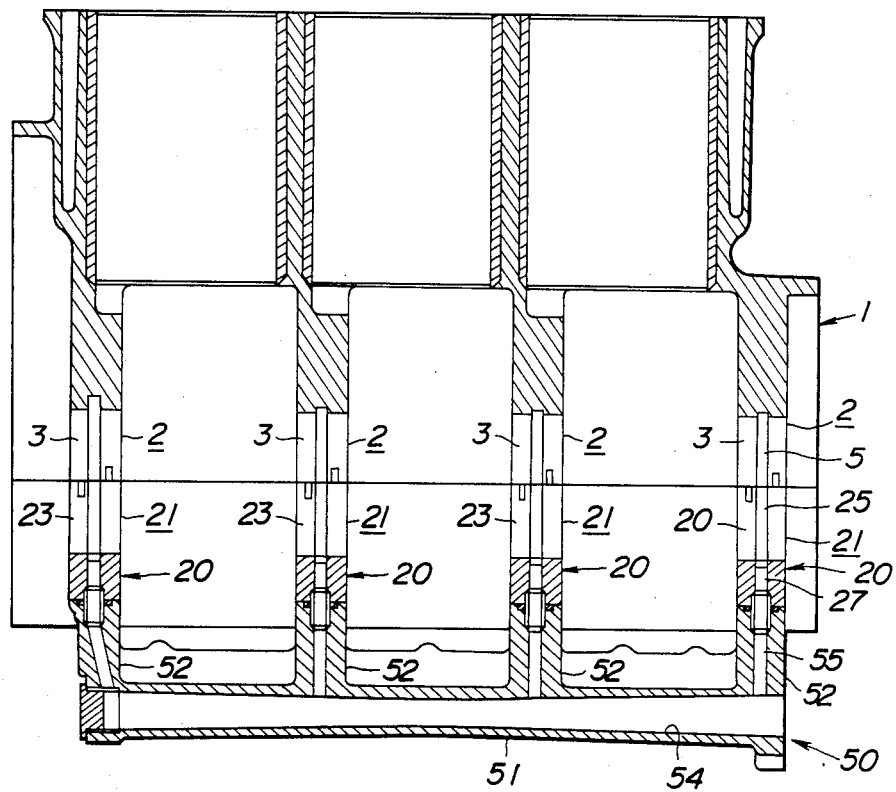
FIG. 4 is a sectional side view of the lubricant feed system shown in FIG. 1.

As shown in FIG. 1 and FIG. 4, an oil main gallery 54 extends longitudinally within the body 51 of the bridge 50. The oil main gallery 54 is in communication with the oil groove 25 via passages 55 formed in the bridge 50 and passages 27 formed in the bearing caps 20.

Figure 3:
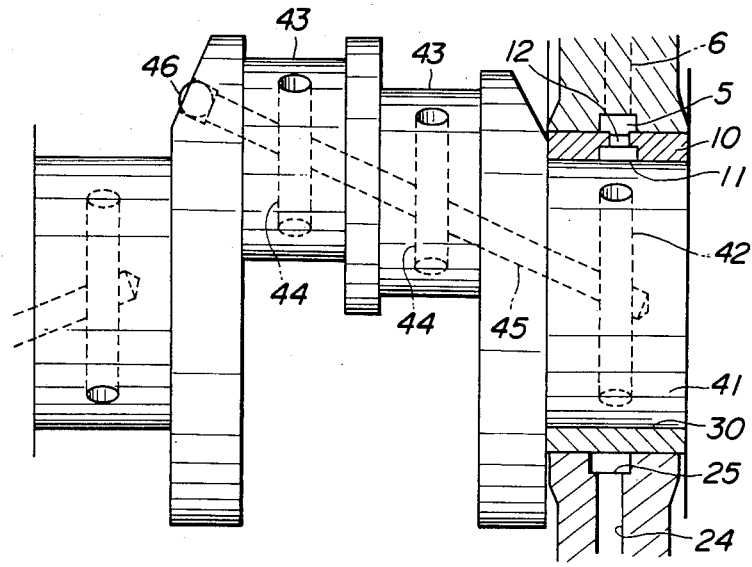
FIG. 3 is a sectional front view of a journal.

As shown in FIG. 2 and FIG. 3, diametrically extending passages 42 are formed in the journal 41 of the crankshaft 40, one end of each passage 42 is directed to the oil groove 11 of the first recess 2. Also, diametrically extending passages 44 are formed in pins 43 of the crankshaft 40. The passages 44 are communicated with the corresponding passage 42 by means of communicating passages 45 extending longitudinally of the crankshaft 40. In FIG. 3, reference numeral 46 represents balls adapted to close one end of each of the communicating passages 45.

Figure 5:
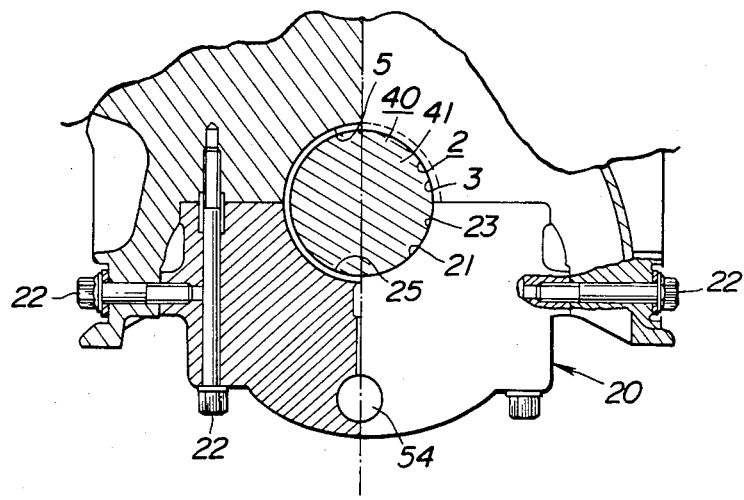
FIG. 5 is a sectional front view of a lubricant feed system according to a second embodiment of the invention.

FIG. 5 illustrates a lubricant feed system according to a second embodiment of the invention. As shown, the bridge 50 is integrated in the bearing caps 20. The oil main gallery 54 is formed in the bearing caps 20.

The flow of lubricant in the lubricant feed system according to the invention will below be described with reference to FIGS. 1-3.

The lubricant in the oil main gallery 54 is first introduced into the annular grooves 26 via the passages 27 and 55. Part of the lubricant is fed through the openings 4 and the passages 6 to the cylinder head while the other part of the lubricant is fed to the oil grooves 11 via the apertures 12. The lubricant fed to the oil grooves 11 is then fed to the inner peripheral surfaces of the first bearings 10 and the second bearings 30 via the passages 42. Further, the lubricant is fed to the inner peripheral surfaces of the pins 43 of the crankshaft 40 via the passages 44 and communicating passages 45.

In the event that the first and second bearings are incorrectly arranged, namely, when the first bearing is arranged on the second recess, or when the second bearing is arranged on the first recess, the lubricant may still properly be fed to the inner peripheral surfaces of the first and second bearings, and the pins 43 of the crankshaft 40 via the annular grooves 26, apertures 12 and passages 42.

While there has been described what is at present considered to be the preferred embodiments of the invention, it will be understood that the invention is not limited thereto, and that various changes and modifications may be made therein without departing from the spirit and scope thereof.

What is claimed is:

1. A lubricant feed system for a journal of a crankshaft comprising first bearing supporting portions formed in a cylinder block, each having a peripheral surface, second bearing supporting portions formed in caps, each having a peripheral surface, first bearings arranged on said first bearing supporting portions, second bearings arranged on said second bearing supporting portions, and at least one oil main gallery, wherein annular grooves are circumferentially formed at the respective first and second bearing supporting portions, wherein oil grooves are circumferentially formed at the inner peripherial surfaces of said first bearings and apertures are formed at said first bearings to communicate said annular grooves with said oil grooves, wherein the inner peripheral surfaces of said second bearings are made flat, and wherein said oil main gallery is communicated with said annular grooves at said second bearings respectively.

2. A lubricant feed system according to claim 1, wherein said oil main gallery is provided in said bearing caps.

3. A lubricant feed system according to claim 1, wherein a bridge is fixedly mounted on the undersides of the caps and said oil main gallery is provided in said bridge.

* * * * *